United States Patent [19]
Sirek

[11] 3,730,206
[45] May 1, 1973

[54] FLUSHING VALVE ARRANGEMENT FOR REVERSIBLE HYDROSTATIC GEAR MECHANISMS

[75] Inventor: Tomas Sirek, Hausen, Germany

[73] Assignee: Constantin Rauch, Upm, Donau Listrasse, Germany

[22] Filed: Dec. 1, 1971

[21] Appl. No.: 203,522

[30] Foreign Application Priority Data

Dec. 17, 1970 Germany..................P 20 62 308.9

[52] U.S. Cl. ....................137/87, 60/52 B, 60/53 R, 137/110, 137/119
[51] Int. Cl................................................F16d 31/00
[58] Field of Search........................137/87, 109, 110, 137/118, 119; 60/52 B, 53 R

[56] References Cited

UNITED STATES PATENTS

| | | | |
|---|---|---|---|
| 2,069,366 | 2/1937 | Heerdt | 137/109 X |
| 2,122,045 | 6/1938 | Rose et al. | 137/87 X |
| 2,961,829 | 11/1960 | Weisenbach | 60/53 R |
| 3,507,298 | 4/1970 | Ratliff | 60/53 R |
| 3,561,214 | 2/1971 | Bobst | 60/53 R |

Primary Examiner—Martin P. Schwadron
Assistant Examiner—David J. Zobkiw
Attorney—Roger W. Erickson

[57] ABSTRACT

A flushing valve arrangement for reversible hydrostatic gear mechanisms with a closed circuit and a feed pump which communicates through non-return valves with each of two main lines of the circuit and with a pressure relief valve connected to a storage container. Its inlet can, through a flushing reciprocating valve and as a function of the pressure in the relevant high pressure line, communicate with whichever main line is carrying the low pressure. The flushing reciprocating valve comprises two coaxially and mirror-symmetrically disposed valve bodies enclosing a common valve space which communicates with said pressure relief valve, said valve bodies having within them displaceable and likewise mirror-symmetrically disposed piston slides reciprocally braced through a spring between said slides. Each piston slide has an inner valve space communicating with the common valve space and with the feed pump. Each valve body with its associated piston slide by means of a sealing piston face and a valve seat forms an annular space which can be closed off from the common valve space and which communicates at any time with one of the main lines. Each main line is connected through a control valve to a control space on the outer end face of the other piston slide which forms an annular space connected to the other main line.

5 Claims, 1 Drawing Figure

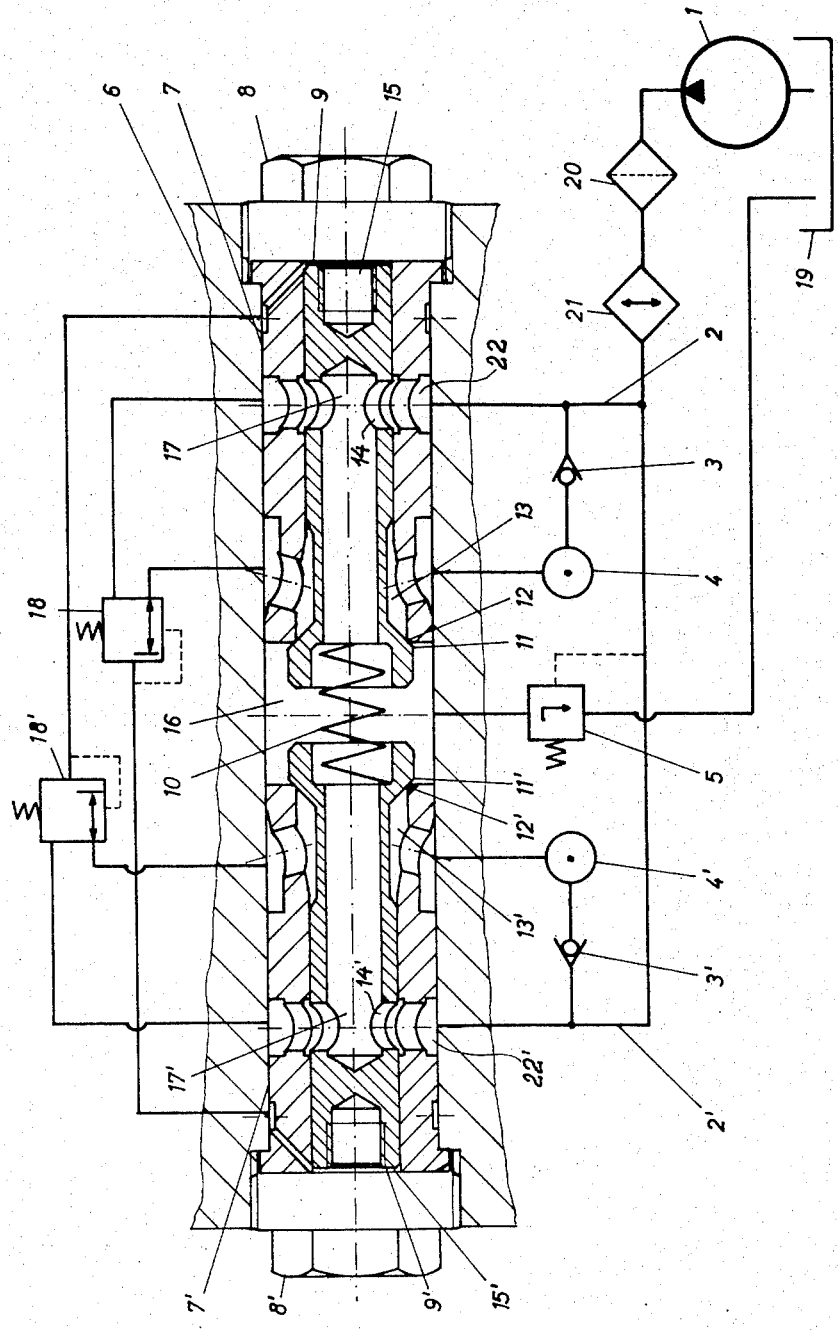

FLUSHING VALVE ARRANGEMENT FOR REVERSIBLE HYDROSTATIC GEAR MECHANISMS

This invention relates to a flushing valve arrangement for reversible hydrostatic gear mechanisms with a closed circuit including a feed pump connected through non-return valves to each of two main lines of the circuit and a pressure relief valve connected to a storage container. The input of the pressure relief valve is connectable through a flushing reciprocating valve and, as a function of the pressure in the particular high pressure line concerned, to whichever main line is carrying the low pressure.

Such valve arrangements are intended to feed fresh oil constantly to the circuit in order to replace oil losses and to replace the hot circuit oil continuously for cooled fresh oil. Furthermore, they are intended both to maintain the feed pressure at a definite level and to restrict the circuit pressure.

In an arrangement of the aforementioned type, a feeding filler pump is connected through non-return valves to the main lines and, connected to a storage container is a low pressure relief valve, the inlet of which is connected through a reciprocating valve to whichever main line carries the low pressure. The reciprocating valve is reversed by the differential pressure in the two main lines. A high pressure relief valve is provided whose input is connected to whichever main line is carrying the high pressure (DAS 1 400 668). The reciprocating valve also has connecting apertures and control grooves, through which the main line carrying the high pressure is connected to the high pressure relief valve, the outlet of which discharges into the inlet of the low pressure relief valve. With this arrangement, a special high pressure limiting valve is provided which must be designed for the full output of the high pressure circuit. In addition, where this known arrangement is concerned, an additional low pressure valve is required so that, in the neutral position of the reciprocating valve, it is possible to draw off the filling oil being passed by the filler pump.

In the case of another known arrangement, the last mentioned additional low pressure valve is not required, because a direct connection is provided between the feed pump and the pressure relief valve via the flushing arrangement, i.e., the reciprocating valve. However, this known arrangement does not act as a pressure limiting valve for the high pressure circuit so that additional high pressure valves and/or reversing valves would be required.

One general object of the present invention is to solve the problem of providing a valve arrangement of the aforementioned type that will serve at the same time as a pre-control high pressure limiting valve so that the flushing process will not be interrupted.

In general this problem is solved by a flushing reciprocating valve comprising two coaxially and mirror-symmetrically disposed valve bodies which enclose a common valve space that communicates with a pressure relief valve and within these bodies are displaceable, mirror-symmetrical piston slides which are braced with respect to each other through a spring, each slide having an inner valve space communicating with the common valve space, the inner valve space communicating with the feed pump. Each valve body, with its associated piston slide and by means of a sealing piston surface and a valve seat, forms an annular space which can be closed off from the common valve space and which communicates in each case with one of the main lines. Each main line is connected through a control valve to a control space on the outer end of the other piston slide, which forms the annular space connected to the other main line.

It is already known (U.S. Pat. No. 2,122,045) in the case of a reversible hydrostatic gear mechanism with a closed circuit, to provide a reciprocating valve which connects the main line carrying the low pressure with a feed pressure line, according to the pressure in the relevant high pressure line, in order to make up leakage oil losses in the mechanism. The reciprocating valve likewise has two coaxially and mirror-symmetrically disposed piston slides, a common valve space located between the two piston slides being connected to the feed pump. However, here this valve space is connected directly to whichever main line is carrying the low pressure.

When an inadmissible pressure arises in the high pressure line of the gear mechanism, the piston slide associated with the high pressure line lifts off its seating against the initial tension of a spring which urges the two piston slides towards each other, pressing them onto a seating. This connects the high pressure line to the valve space of the swinging valve and thus to the low pressure line. Where the known gear mechanism is concerned, a flushing valve is not provided, so that flushing in any stage of operation is not possible.

The construction of the present arrangement offers the decisive advantage that it serves at the same time as a pressure limiting valve for the high pressure circuit without a special high pressure limiting valve, which would need to be designed for the full output of the high pressure circuit, being provided. Only a control valve designed for lesser output, possibly corresponding to the output of the feed circuit, need be provided. The design of the arrangement is such that the flushing process is not interrupted even if there is a response to overpressure in the high pressure circuit. Thus, the flushing valve arrangement proposed is particularly suitable for gear mechanisms of high output.

In an advantageous further development of the invention, after the force of the spring bracing the piston slide has been overcome, the facing inner ends of the piston slides bear sealingly on each other, separating the inner valve spaces from the common valve space. The design of the bracing spring will generally be such that the piston slides bear in sealing-tight manner on each other when maximum possible flushing is to be achieved.

To this end, in a further development of the invention, the inner valve spaces of the piston slides communicate with the feed pump through an aperture which, in the neutral position of each piston slide, aligns with a connecting aperture for a feed line in the valve body. In consequence, at maximum flushing, the entire quantity of feed oil is fed through the non-return valve into the main line of the circuit which is at that time carrying low pressure.

Other objects, advantages and features of the present invention will become apparent from the following detailed description of an exemplary embodiment of the invention as will be explained in greater detail hereinafter with reference to the attached drawing, which is a partially diagrammatic view in section of a flushing valve arrangement according to the present invention.

Referring to the drawing, a valve housing 6 has a continuous cylindrical bore into which, from each end, a valve body 7, 7' can be inserted and secured by means of a screw 8, 8'. In the valve bodies 7, 7' slide mirror-symmetrical slides 9, 9' which, in the region of their facing inner ends, have a sealing piston face 11, 11' and which are braced with respect to each other through a spring 10. The piston faces 11, 11' bear on valve seats 12, 12' constructed in the valve bodies 7, 7'. Thus, two annular spaces 13, 13' are formed which are connected on the other hand to the main lines 4, 4' and on the other, through control valves 18, 18' to control spaces 15', 15 on the remote outer end spaces of the other piston slide 9' 9. The control valves 18, 18' are constructed as three-way throttle valves which are adjustable by the supply pressure and which, from the moment of reaching a predetermined pressure in the high pressure circuit or in the main line 4, 4', start to close. The outflow connections of the control valves 18, 18' communicate with inner valve spaces 17, 17' which are formed in the piston slides 9, 9'. Feed lines 2, 2' discharge into these valve spaces 17, 17'. The inner valve spaces 17, 17' communicate through the facing sides of the piston slides 9, 9' with the common valve space 16 which in turn connects with the feed pressure valve 5 which again discharges into the storage container 19. Situated downstream of the feed pump 1 are filters 20 and a cooling means 21, from which the feed oil can pass through the feed lines 2, 2', through non-return valves 3, 3' into the low pressure main line 4, 4'. The feed lines 2, 2' discharge thereby into the low pressure main line 4, 4' at a place which, in the direction of flow of the oil, is located in the line and downstream of the connection of the feed pressure valve 5 or the annular spaces 13, 13' (a place which is not shown in the drawing). This guarantees that the entire quantity of flushing oil fed in is supplied to the circuit, after the heated oil has been discharged — which happens by the backwash of old oil against the fresh (flushing) oil.

The valve arrangement operates in the following way:

1. As long as there is no difference in pressure in the cricuit and thus in the main lines, 4, 4', the flushing reciprocating valve or the two piston slides 9, 9' remain in the position shown in the drawing. While this is so, the oil passed by the feed pump 1 out of the storage container 19 through the feed lines 2, 2', via the non-return valves 3, 3', will replace the leakage oil losses in the circuit. The excess quantity of feed oil flows through the feed lines 2, 2', the connecting apertures 22, 22' and the apertures 14, 14' in the piston slides 9, 9' to the inner valve spaces 17, 17' and from there to the common valve space 16 and the feed pressure valve 5 back into the storage container 19.

2. If the pressure rises for example in the main line 4, then the associated non-return valve 3 closes. The increased pressure acts on the partial surface of the sealing piston face 11 which is limited by the seat 12 in the valve space 13 and acts at the same time through the fully opened throttle 18 in the control space 15'. The effective piston area in the control space 15' is dimensioned larger than the described partial area of the piston face 11 in the valve space 13, so that the piston slide 9' moves rightwards until equilibrium is established with the force of the spring 10. The valve formed by piston face 11 and seat 12 remains closed thereby. The valve formed between the piston face 11' and the seat 12' is continuously opened during the process described and flushing takes place by the drawing of oil from the circuit into the common valve space 16 and from there through the feed pressure valve 5 into the storage container 19.

3. With effect from a high pressure in the main line 4 which is determined by the construction of the spring 10 so the piston slide 9' has its inner end face bearing in sealing-tight manner on the inner end face of the piston 9. Thus, the inner valve spaces 17, 17' are connected to each other and separated from the valve space 16, so that the entire quantity of feed oil is passed by the feed pump 1 through the non-return valve 3' into the main line 4' which is carrying the low pressure.

4. If, in the main line 4, the maximum pressure adjusted by the response point of the control valve or the throttle 18 is exceeded, then the throttle 18 starts to close and lowers the pressure in the control chamber 15'. Thus, the pressure acting on the partial area of the piston face 11 of the piston slide 9 in the valve chamber 13 predominates and lifts the piston face 11 off the seat 12. With this, the piston 9 and the piston 9' which in this condition bears on it in sealing-tight manner take over as one unit the function of a pressure limiting valve. The oil which is thereby splashed into the valve face 16 from the circuit is discharged through the feed pressure valve 5 in the storage container 19, so long as the quantity of fed-in feed oil is not exceeded. If the quantity is exceeded, the excess part of the oil flows through the opened valve which is formed between the piston face 11' and the seat 12' and into the main line 4' which is carrying the low pressure.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a flushing valve arrangement for reversible hydrostatic gear mechanisms with a closed circuit and a feed pump which communicates through non-return valves with each of the two main lines of the circuit, and with a pressure relief valve connected to a storage container and of which the inlet can, through a flushing reciprocating valve and as a function of the pressure in the relevant high pressure line, communicate with whichever main line is carrying the low pressure, the improvement wherein the flushing reciprocating valve comprises two coaxially and mirror-symmetrically disposed valve bodies enclosing a common valve space which communicates with said pressure relief valve, said valve bodies having within them displaceable and likewise mirror-symmetrically disposed piston slides reciprocally braced through a spring between said slides, each said slide having an inner valve space communicating with the common valve space and with the feed pump, each said valve body with its associated piston slide, by means of a sealing piston face and a valve seat, forming an annular space which can be closed off from the common valve space and which communicates with at any time one of the main lines, each main line being connected through a control valve to a control space on the outer end face of the other piston slide which forms an annular space connected to the other main line.

2. The flushing valve arrangement according to claim 1 wherein the force of the spring which braces the piston slides is such that when it has been overcome, the facing inner ends of the piston slides bear on each other in sealing-tight manner, separating the inner valve spaces from the common valve space.

3. The arrangement according to claim 2 wherein the inner valve spaces of the piston slides are connected to the feed pump through an aperture which, in the neutral position of each piston slide, aligns with a connecting aperture for a feed line in the valve body.

4. The arrangement according to claim 3 wherein said control valves are three-way throttle valves which are adjustable by the supply pressure, their outflow connection being connected to said inner valve space of the associated piston slide.

5. The arrangement according to claim 3 wherein the inflow aperture of each said control valve is connected to said annular space of the associated piston slide.

* * * * *